(12) United States Patent
Rousselot

(10) Patent No.: US 12,467,525 B2
(45) Date of Patent: Nov. 11, 2025

(54) TRANSMISSION HOUSING AND WHEELED VEHICLE PROVIDED WITH SUCH A TRANSMISSION HOUSING

(71) Applicant: FRANCE REDUCTEURS, Les Herbiers (FR)

(72) Inventor: Rémi Rousselot, Les Herbiers (FR)

(73) Assignee: FRANCE REDUCTEURS, Les Herbiers (FR)

( * ) Notice: Subject to any disclaimer, the term of this patent is extended or adjusted under 35 U.S.C. 154(b) by 293 days.

(21) Appl. No.: 18/271,443

(22) PCT Filed: Jan. 7, 2022

(86) PCT No.: PCT/FR2022/050037
§ 371 (c)(1),
(2) Date: Jul. 7, 2023

(87) PCT Pub. No.: WO2022/157438
PCT Pub. Date: Jun. 28, 2022

(65) Prior Publication Data
US 2024/0060557 A1 Feb. 22, 2024

(30) Foreign Application Priority Data

Jan. 25, 2021 (FR) ..................................... 21 00656

(51) Int. Cl.
*F16H 57/021* (2012.01)
*A01D 69/06* (2006.01)
(Continued)

(52) U.S. Cl.
CPC ........... *F16H 57/021* (2013.01); *A01D 69/06* (2013.01); *F16H 1/16* (2013.01); *F16H 57/039* (2013.01);
(Continued)

(58) Field of Classification Search
CPC . A01D 69/06; F16H 1/16; F16H 2057/02008; F16H 2057/02056;
(Continued)

(56) References Cited

U.S. PATENT DOCUMENTS 1,396,025 A * 11/1921 Dahlquist ........... F16H 57/0498
184/6.12
1,828,546 A * 10/1931 Sandstrom .......... F16H 57/0457
184/13.1
(Continued)

FOREIGN PATENT DOCUMENTS

JP 2005 170132 6/2005
WO 2018/015633 1/2018

OTHER PUBLICATIONS

International Search Report dated Sep. 30, 2021.

*Primary Examiner* — Jake Cook
(74) *Attorney, Agent, or Firm* — IPSILON USA, LLP

(57) ABSTRACT

Transmission housing (1) having a body (2) formed by two shells (2A, 2B) and comprising a rotary input shaft (4) and an output shaft (5), the rotary input shaft (4) comprising a driving end (6) and a threaded portion (7) and having mounted on it a rolling-element bearing (8) arranged between the threaded portion (7) and the driving end (6), said housing (1) creating, inside the enclosure (3), a station (12) for receiving the rolling-element bearing (8) and a station (13) for receiving the threaded portion (7). The housing (1) comprises a barrier (14) positioned between said stations (12, 13), this barrier (14) extending around said input shaft (4), creating a through-passage (15) for access for the input shaft (4) from one station (12) to the other (13), this barrier (14) being formed in at least two portions (16, 17), each barrier portion (16, 17) being produced in a single piece with the associated shell (2A, 2B), at least one of the barrier portions (16, 17) being shaped so as to create at least one
(Continued)

Figure 1:
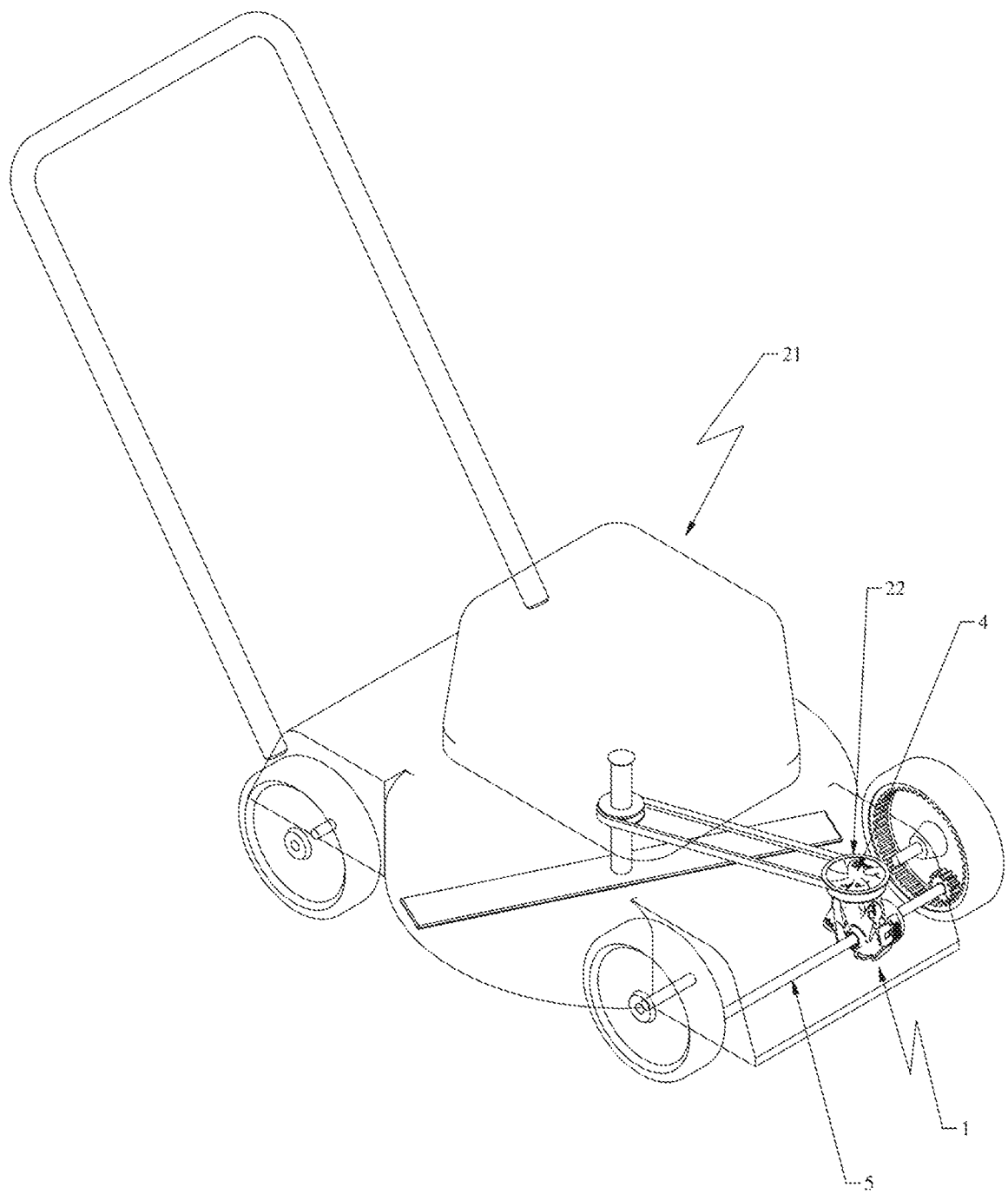

deflector (161) formed at least partially by an inclined surface having a slope that descends from the body (2) of the housing (1) towards the input shaft (4), when the input shaft (4) is positioned vertically with the rolling-element bearing (8) extending above the threaded portion (7) of the input shaft (4).

12 Claims, 14 Drawing Sheets

(51) Int. Cl.
 *F16H 1/16* (2006.01)
 *F16H 57/02* (2012.01)
 *F16H 57/039* (2012.01)
 *F16H 57/04* (2010.01)
(52) U.S. Cl.
 CPC ..... *F16H 57/0409* (2013.01); *F16H 57/0457* (2013.01); *F16H 57/0498* (2013.01); *F16H 2057/02056* (2013.01)
(58) Field of Classification Search
 CPC ........... F16H 2057/0213; F16H 57/021; F16H 57/039; F16H 57/0409; F16H 57/0457; F16H 57/0498; F16H 57/0423
 See application file for complete search history.

(56) References Cited

U.S. PATENT DOCUMENTS 9,456,546 B2 * 10/2016 Blanchard ............... F16D 7/044
2020/0355257 A1 11/2020 Gries et al.

* cited by examiner

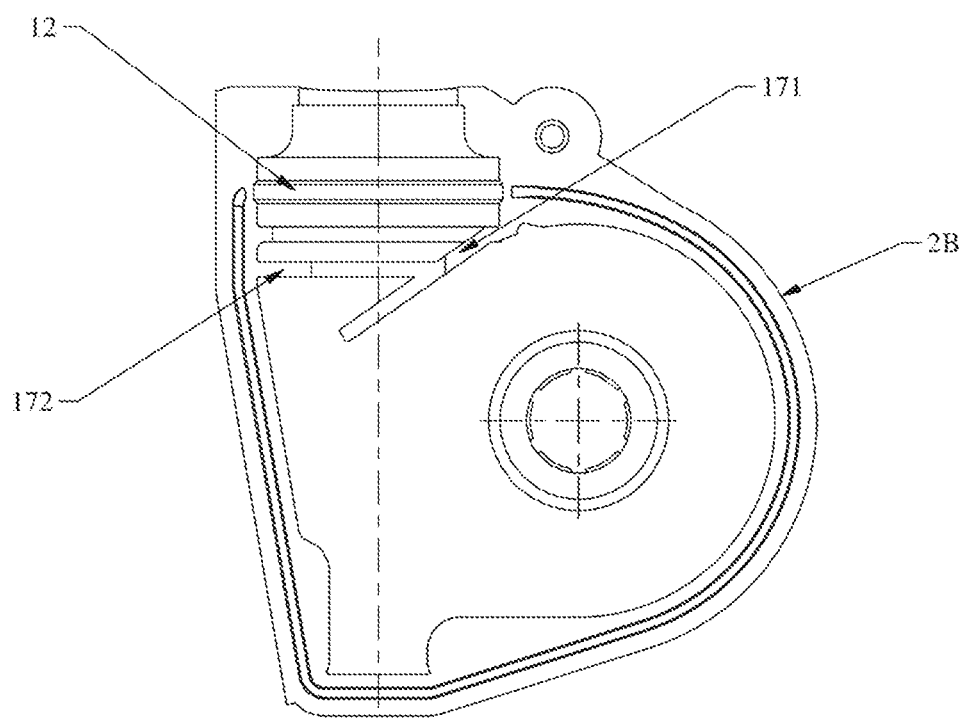

TRANSMISSION HOUSING AND WHEELED VEHICLE PROVIDED WITH SUCH A TRANSMISSION HOUSING

RELATED APPLICATION

This application is a National Phase of PCT/FR2022/050037 filed on Jan. 7, 2022, which claims the benefit of priority from French Patent Application No. 21 00656, filed on Jan. 25, 2021, the entirety of which are incorporated by reference.

FIELD OF THE INVENTION

The present invention relates to a transmission housing and a wheeled vehicle, such as a lawnmower, provided with such a transmission housing.

The invention relates in particular to a transmission housing comprising a body formed by at least two shells that when assembled about a parting line form an enclosure that can be at least partially filled with lubricant, this housing comprising, seated at least partially inside the housing, at least one rotary input shaft with a longitudinal axis and an output shaft to which the rotational movement of the or of the at least one of the input shafts can be transmitted, this rotary input shaft comprising a drive end that is accessible from outside the housing to enable said input shaft to be driven in rotation and a threaded portion to form a worm screw, said input shaft having a bearing comprising a coaxial inner ring surrounding said input shaft and a coaxial outer ring, and bearing members arranged between said rings, said bearing being arranged on the input shaft between the threaded portion and the drive end of said input shaft, said housing including a space for receiving this bearing and a space for receiving the threaded portion inside the enclosure.

DESCRIPTION OF RELATED ART

Such a transmission housing is known from document FR 3072432. Housings are also known from documents JP 2005 170132, US 2020/355257, and WO 2018/015633. There is an ongoing need to enhance the performance and quality of such housings without increasing the footprint of or the number of parts in such housings.

OBJECTS AND SUMMARY

One objective of the invention is to provide a transmission housing with improved performance and quality without increasing the number of parts in said housing.

For this purpose, the invention relates to a transmission housing comprising a body formed by at least two shells that, when assembled about a parting line, form an enclosure that can be at least partially filled with lubricant, this housing comprising, seated at least partially inside the housing, at least one rotary input shaft with a longitudinal axis and an output shaft to which the rotational movement of the or of the at least one of the input shafts can be transmitted, this rotary input shaft comprising a drive end that is accessible from outside the housing to enable said input shaft to be driven in rotation and a threaded portion to form a worm screw, said input shaft having a bearing comprising a coaxial inner ring surrounding said input shaft and a coaxial outer ring, and bearing members arranged between said rings, said bearing being arranged on the input shaft between the threaded portion and the drive end of said input shaft, said housing including a space for receiving this bearing and a space for receiving the threaded portion inside the enclosure, characterized in that the housing comprises a barrier arranged between said spaces, this barrier extending continuously or discontinuously about said input shaft forming an access passage for the input shaft from one space to the other space, this barrier comprising at least two parts, one of said parts being carried by one of the shells and the other of said parts being carried by the other of the shells, each barrier part being integral with the related shell, at least one of the barrier parts being shaped to form one or more deflectors, the or at least one of the deflectors being at least partially formed by a surface sloping downwards from the body of the housing towards the input shaft, when the input shaft is positioned vertically and the bearing is arranged above the threaded portion of the input shaft. This barrier improves the quality of the seal about the bearing and reduces the risk of lubricant passing through the bearing. The barrier is designed to improve the seal without having to attach a gasket. Such a barrier helps to limit the quantity of lubricant projected towards the bearing, such projection being augmented by the direction of rotation of the worm screw. The presence of several surfaces inclined towards the input shaft in the vicinity of the barrier helps to guide the lubricant projected notably by the rotation of the input shaft towards the input shaft.

According to one embodiment of the invention, there are two such deflectors of at least one of the barrier parts, each of said deflectors is formed at least partially by a surface sloping downwards from the body of the housing towards the input shaft, when the input shaft is positioned vertically and the bearing is arranged above the threaded portion of the input shaft, and these deflectors have a joining zone with a V-shaped profile. Multiplying the inclined surfaces helps to better guide the lubricant.

According to one embodiment of the invention, there are two such deflectors of at least one of the barrier parts, each of said deflectors is formed at least partially by a surface sloping downwards from the body of the housing towards the input shaft, when the input shaft is positioned vertically and the bearing is arranged above the threaded portion of the input shaft, these deflectors are not joined, and one of the deflectors extends at least partially above the other deflector. The non-joined deflectors provide a discontinuous barrier, which encourages the lubricant to flow towards the bottom of the housing seating the end of the input shaft opposite the drive end of said input shaft. Axially offsetting at least some of the deflectors can help to guide the lubricant from one deflector towards another deflector in the manner of cascading inclined ramps.

According to one embodiment of the invention, there are two such deflectors of at least one of the barrier parts, one of said deflectors is formed at least partially by a surface sloping downwards from the body of the housing towards the input shaft, when the input shaft is positioned vertically and the bearing is arranged above the threaded portion of the input shaft, and the other deflector is formed at least partially by a surface extending orthogonally to the longitudinal axis of the input shaft.

According to one embodiment of the invention, at least one of the deflectors has a circular arc portion centered on the longitudinal axis of the input shaft to delimit the passage through the barrier. Preferably, each deflector has a circular arc portion to delimit the passage through the barrier, so that the passage is circular in an orthogonal projection in a plane perpendicular to the input shaft.

According to one embodiment of the invention, at least one of the deflectors forms an annular sector, this annular sector, which forms a disk portion, being delimited by two concentric circular arcs and two radiuses, one of the circular arcs forming the circular arc portion of the deflector used to delimit the passage through the barrier, and the other circular arc forming a zone for connecting the deflector to the body of the housing.

According to one embodiment of the invention, when the shells of the housing are assembled, the passage through the barrier has a circular or ovoid shape when viewed from the outside of the housing and, in an orthogonal projection in a plane perpendicular to the longitudinal axis of the input shaft, has a circumference larger than the circumference of the input shaft. A free space is thus formed between the barrier and the input shaft. This design limits the risk of lubricant flowing back towards the bearing.

According to one embodiment of the invention, the parting line of the shells passes through the longitudinal axis of the input shaft and extends perpendicular to the output shaft.

According to one embodiment of the invention, the barrier has a plane of symmetry that coincides with the parting line of the shells. This helps to simplify manufacture.

According to one embodiment of the invention, the housing includes a gear wheel mounted on the output shaft and meshed with the threaded portion of the input shaft, and at least a portion of the surface sloping downwards from the body of the housing towards the input shaft of at least one of the deflectors, when the input shaft is positioned vertically and the bearing is arranged above the threaded portion of the input shaft forms a splash guard between the gear wheel and the bearing and extends in a plane parallel to a plane tangential to said gear wheel. This arrangement helps to interrupt a portion of the lubricant flow created by the gear wheel under the effect of the rotation of the gear wheel, thereby preventing this flow from being projected directly onto the bearing.

The invention also relates to a wheeled vehicle, such as a lawnmower, characterized in that it is provided with a transmission housing as described above.

SHORT DESCRIPTION OF THE DRAWINGS

Figure 2:
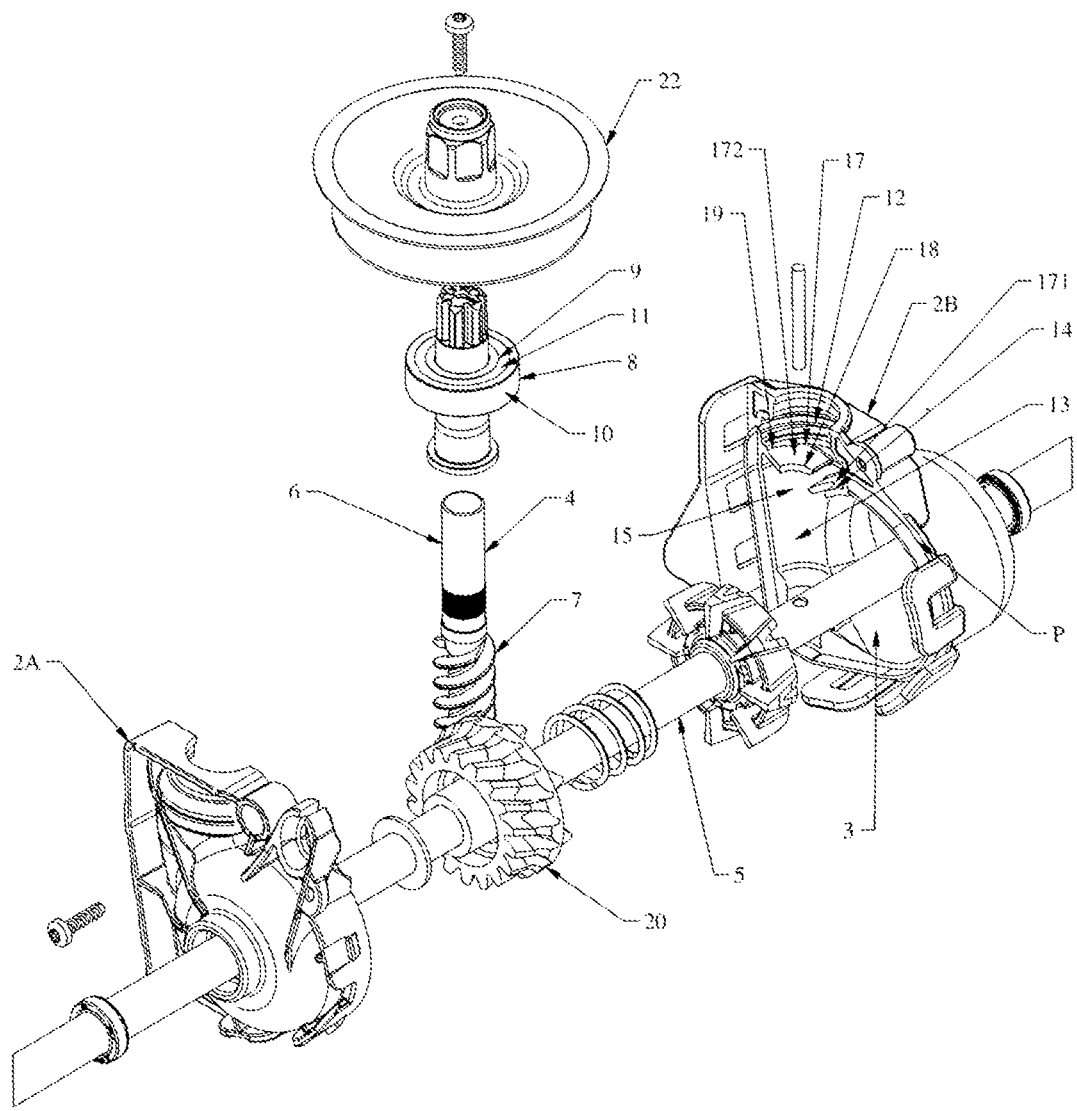
Figure 3:
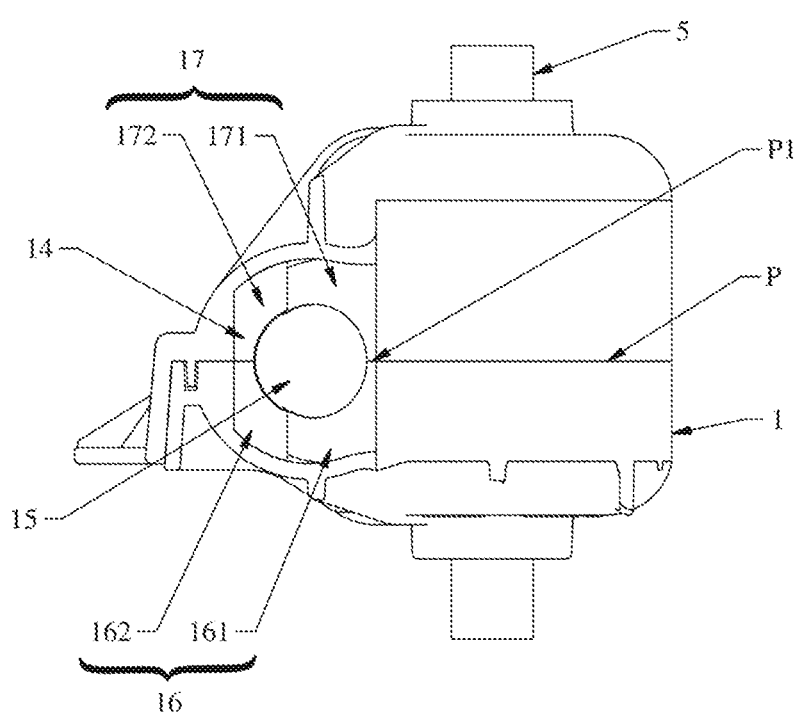
Figure 4:
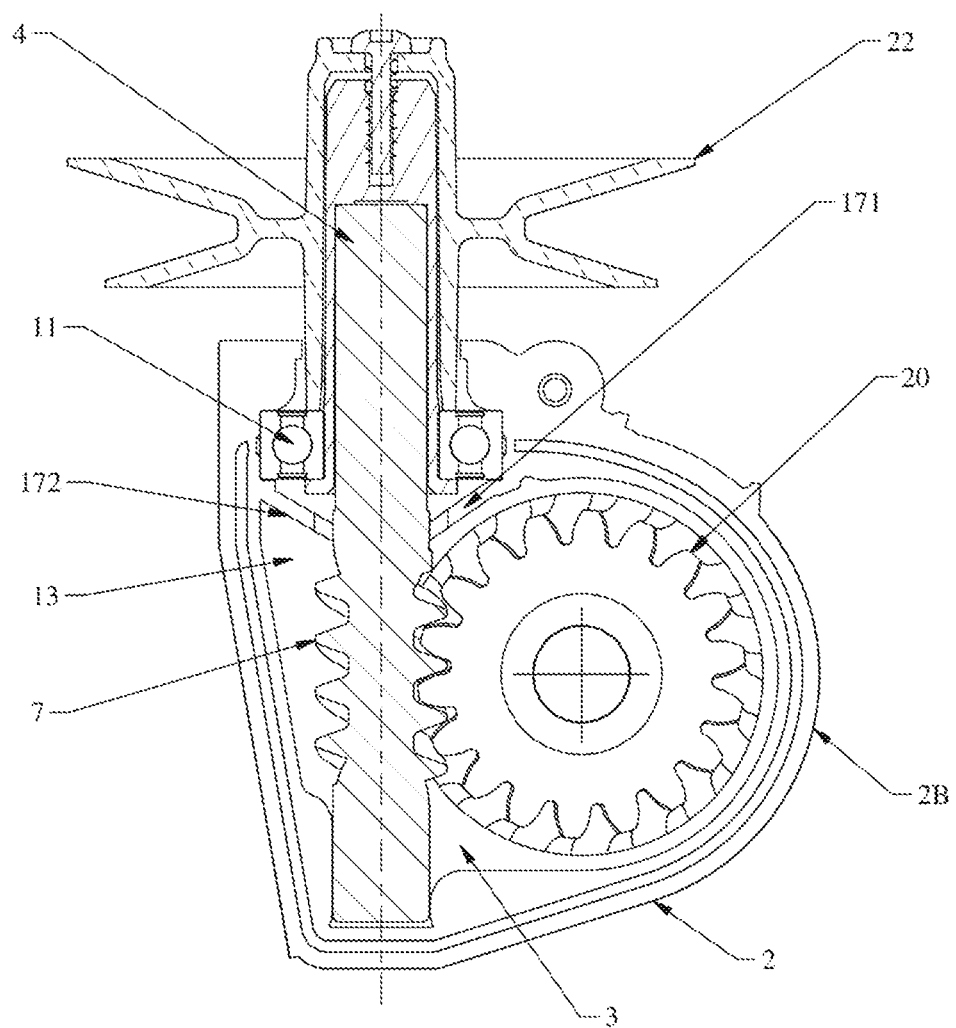
Figure 5:
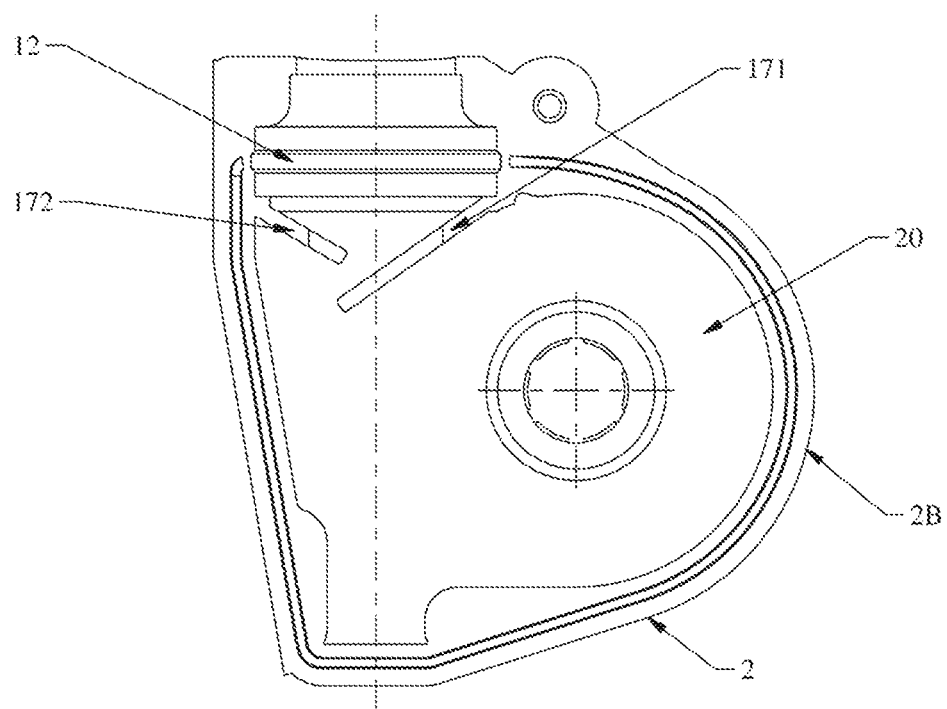
Figure 6:
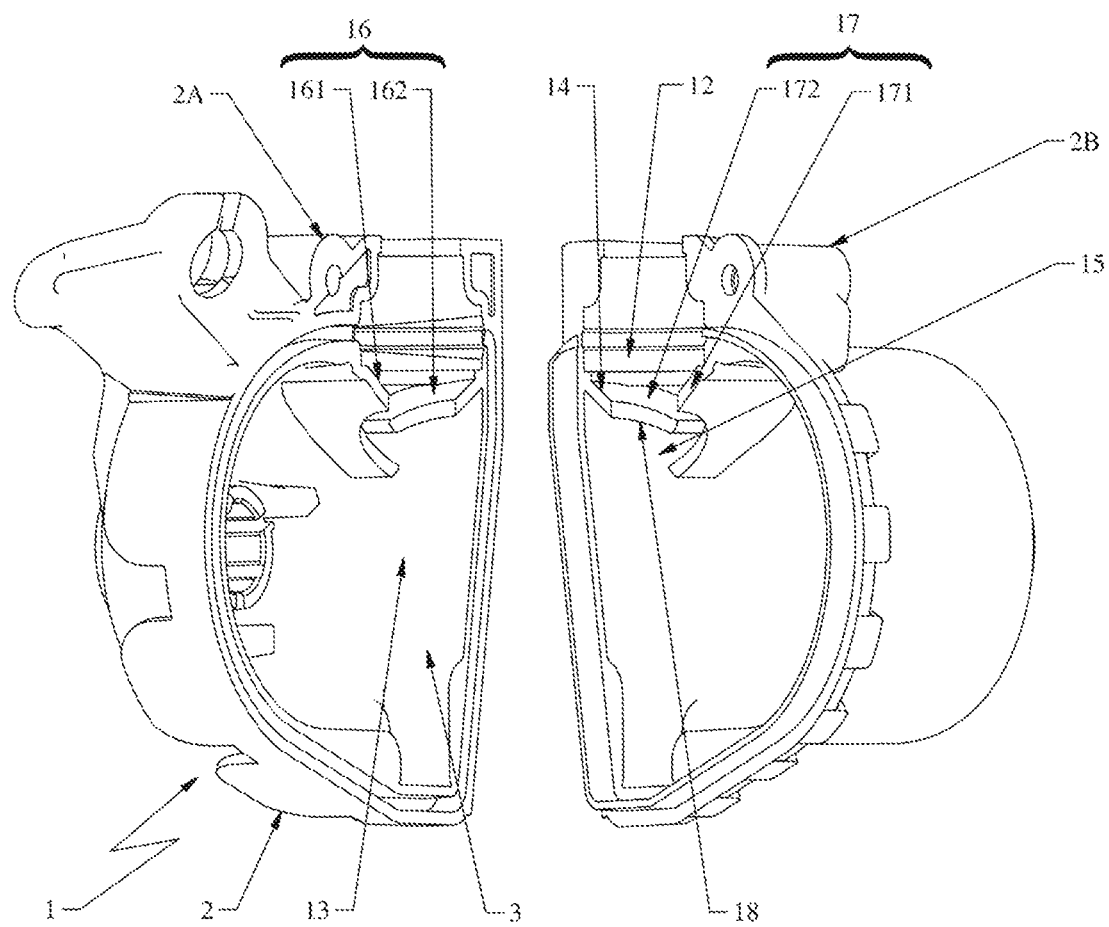
Figure 7:
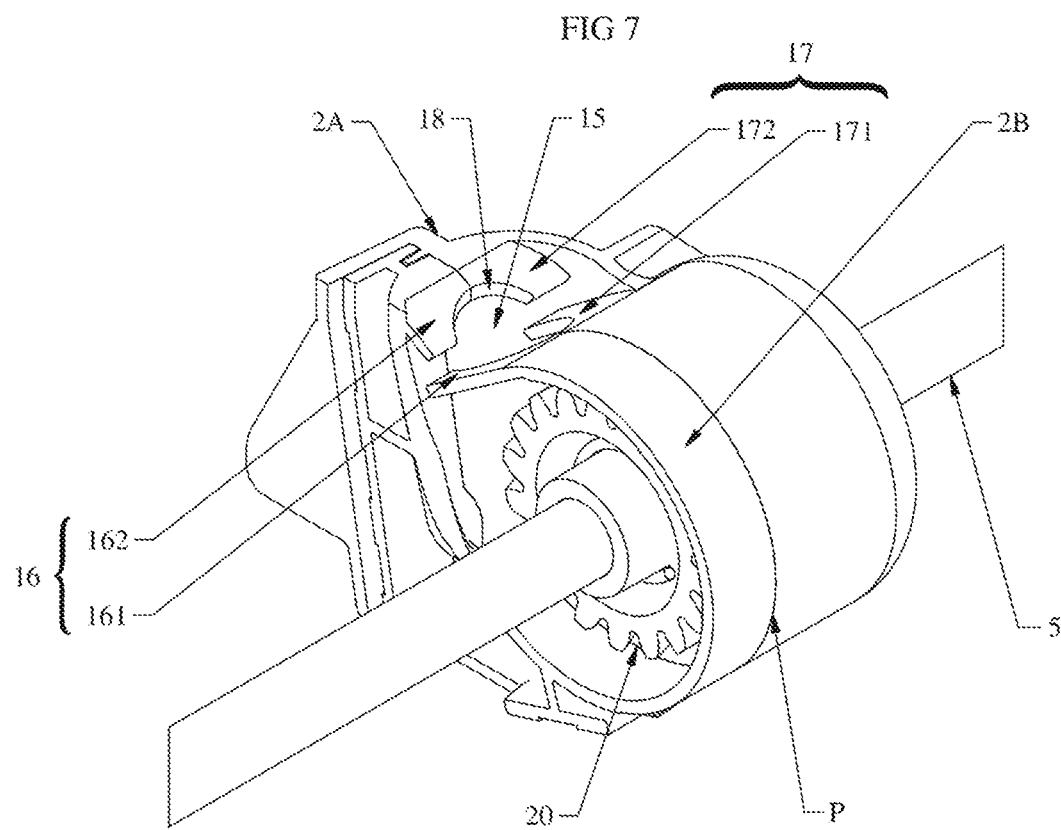
Figure 8:
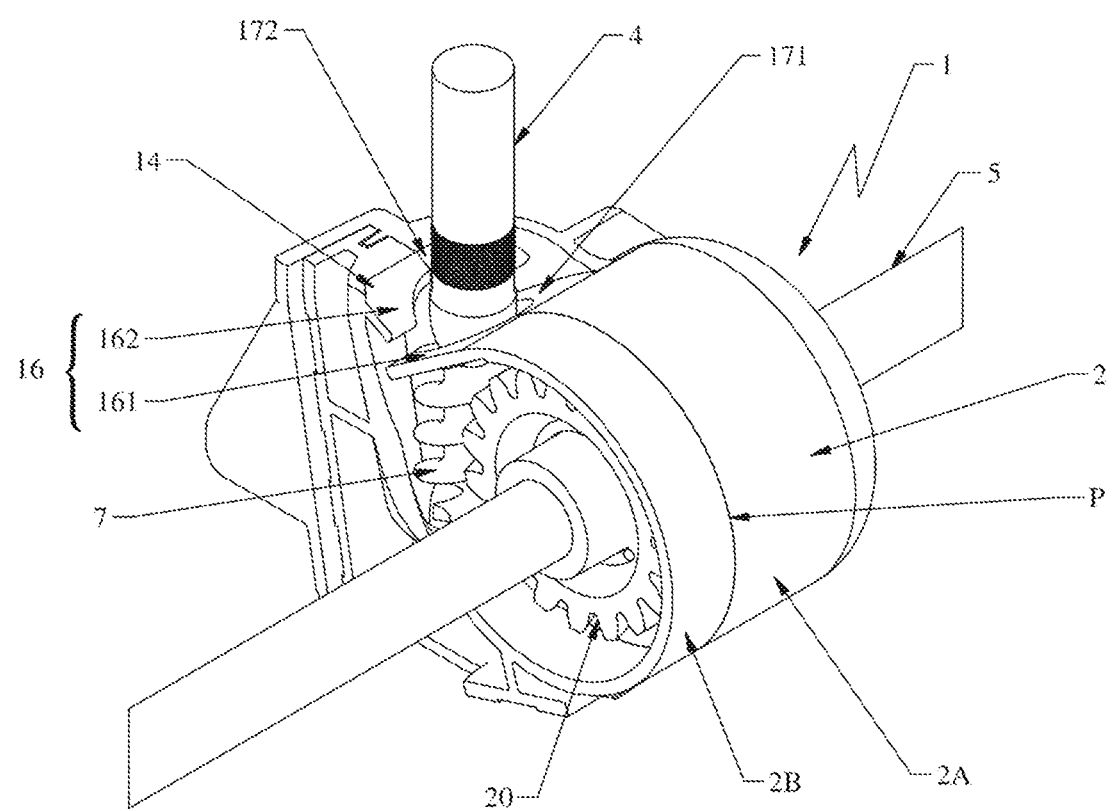
Figure 9:
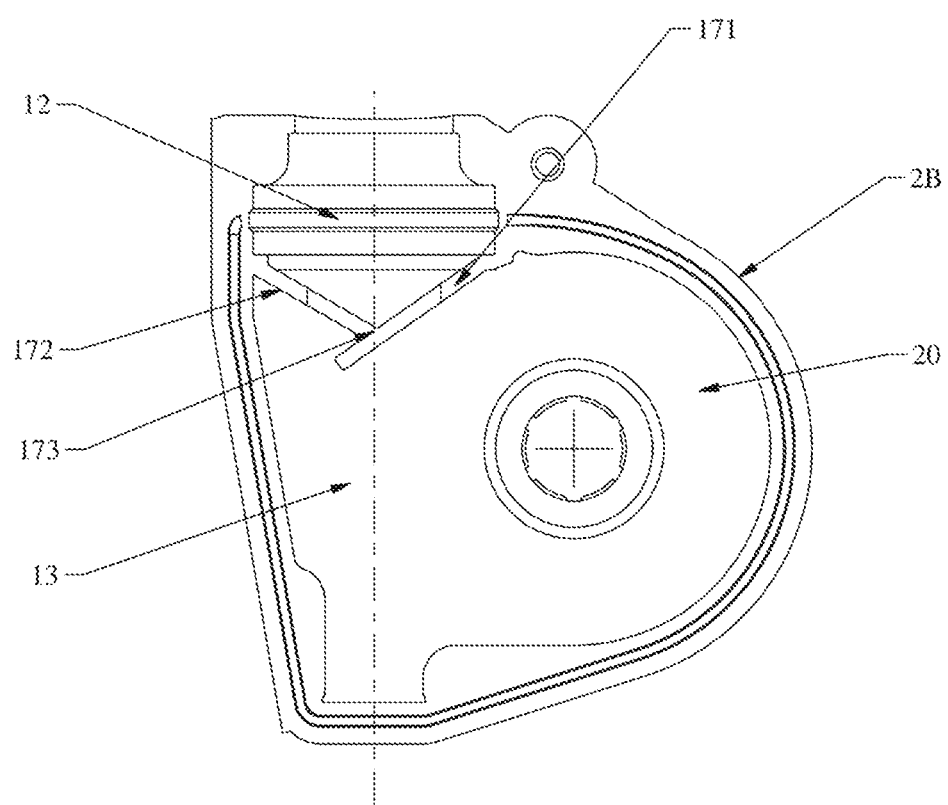
Figure 10:
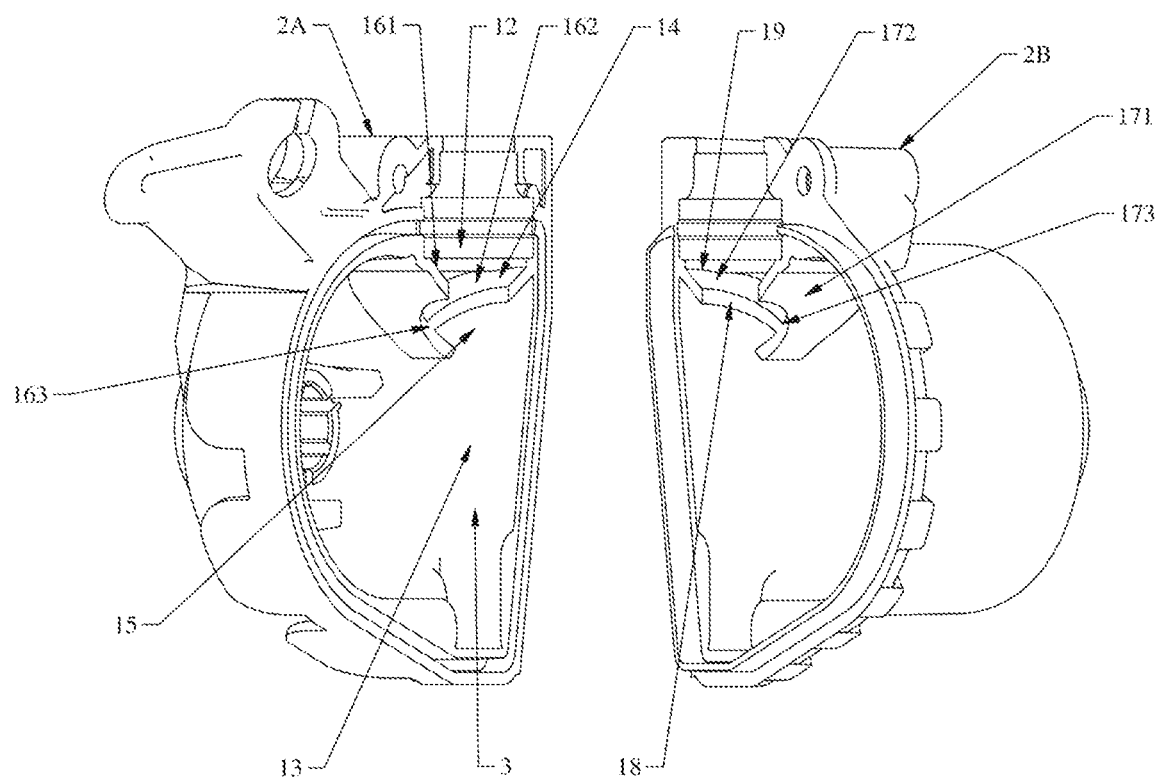
Figure 11:
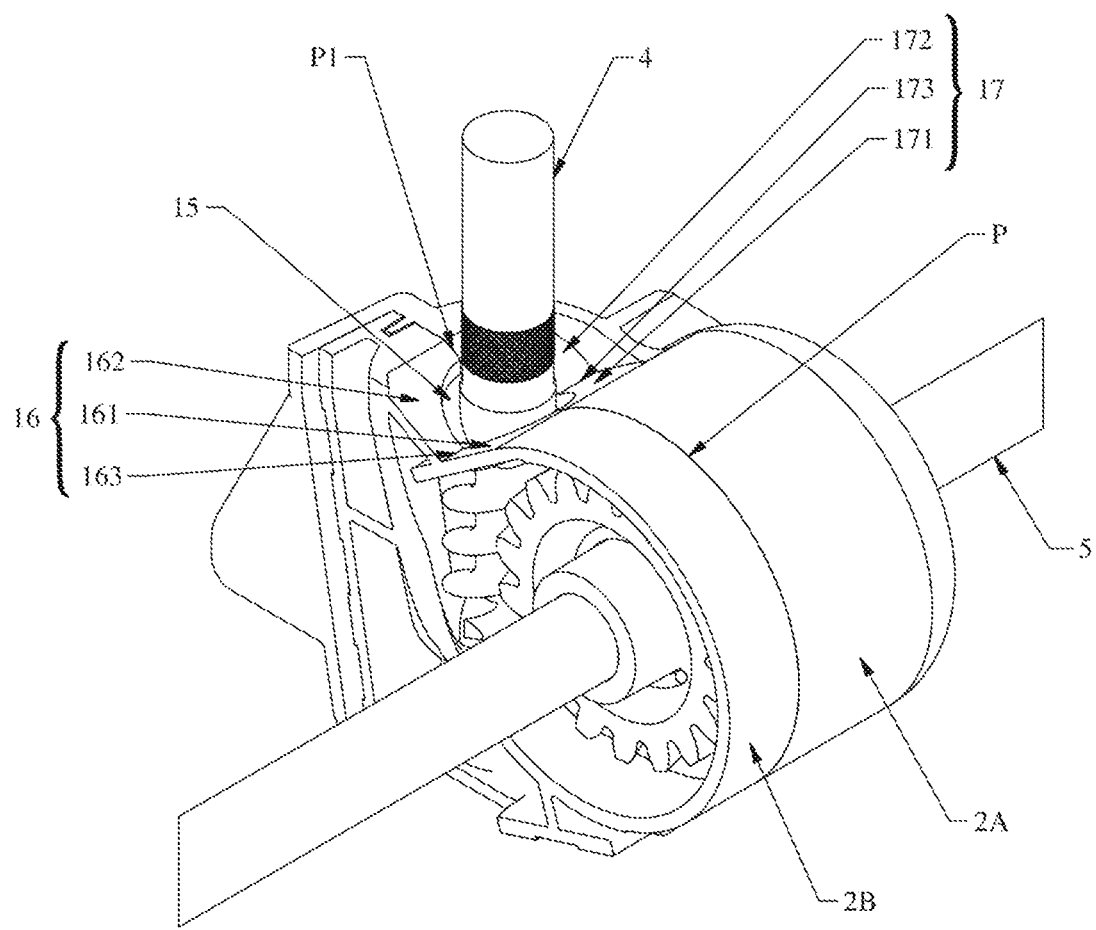
Figure 12:
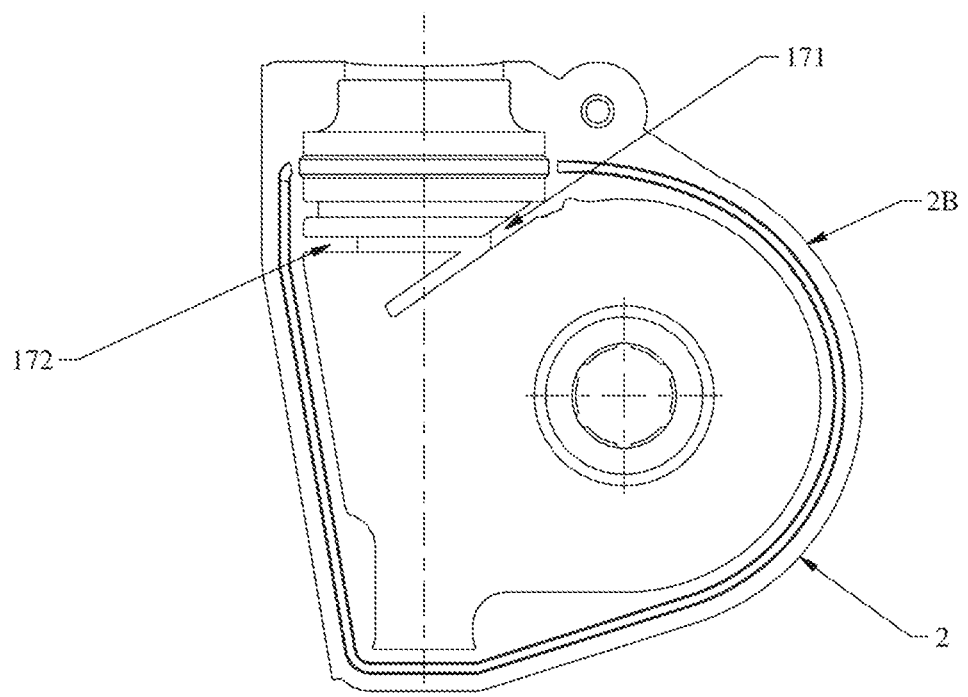
Figure 13:
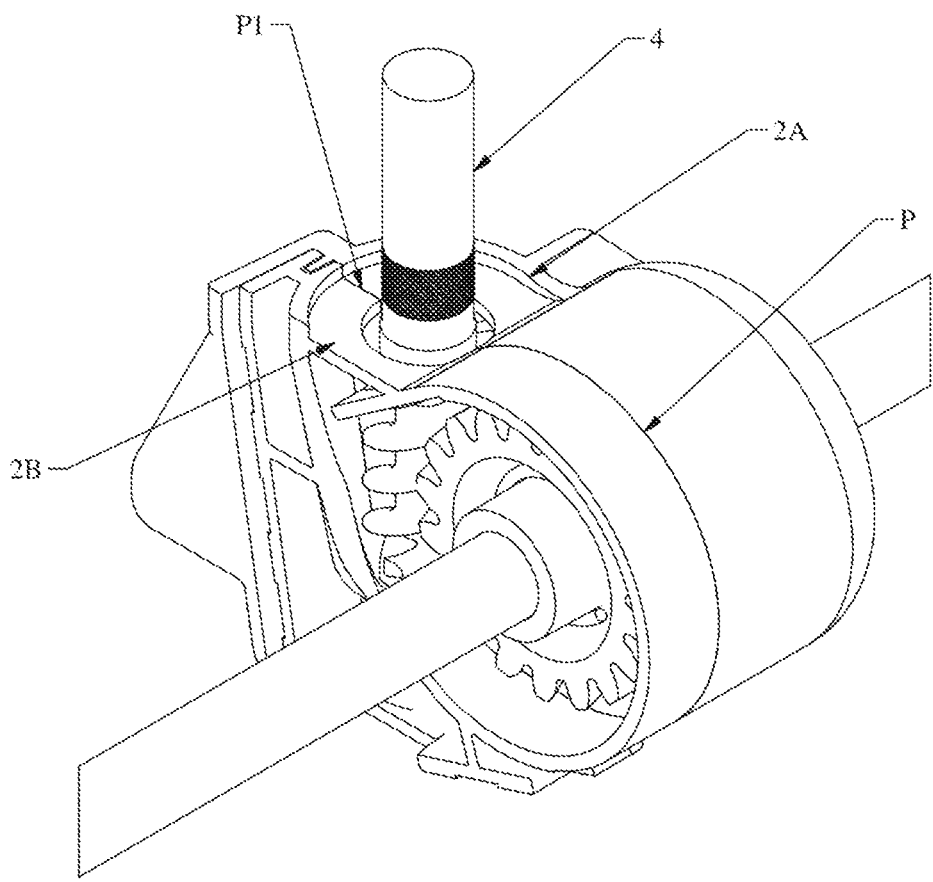

The invention can be better understood from the description of example embodiments provided below with reference to the attached drawings, in which:

FIG. 1 is a perspective view of a vehicle provided with a transmission housing according to the invention, FIG. 2 is an exploded view of the components of a transmission housing, FIG. 3 is a partial top view of a transmission housing according to the invention, with the input shaft removed, FIG. 4 is a partial cross-section view of a transmission housing according to the invention, FIG. 5 is a partial view of the transmission housing shown in FIG. 4, FIG. 6 is a partial perspective view of the transmission housing shown in FIG. 4 with the shells of the housing in the disassembled state, FIG. 7 is a partial view of the transmission housing shown in FIG. 6, with part of one of the shells removed to reveal the inside of the transmission housing, FIG. 8 is a partial view of the transmission housing shown in FIG. 4, with part of one of the shells removed to reveal the inside of the transmission housing, FIG. 9 is a partial cross-section view of a transmission housing with joined deflectors, FIG. 10 is a perspective view of the transmission housing shown in FIG. 9 with the shells of the housing in the disassembled state, FIG. 11 is a perspective view of the transmission housing shown in FIG. 9 with an input shaft, with part of one of the shells removed to reveal the inside of the transmission housing, FIG. 12 is a view of the inside of a shell of a transmission housing, FIG. 13 is a perspective view of a transmission housing, with part of one of the shells removed to reveal the inside of the transmission housing, FIG. 14 is a perspective view of the inside of the shell shown in FIG. 12.

DETAILED DESCRIPTION

As mentioned above, the transmission housing 1 to which the invention relates is more specifically intended for use in a motorized wheel vehicle 21, such as a lawnmower or snowplow, preferably with a walking driver, although the driver may also be seated on the vehicle.

FIG. 1 shows the application of such a transmission housing 1 to a lawnmower. This lawnmower comprises a rolling chassis, the front wheels of said chassis in this case being drive wheels that can be driven in rotation using the transmission housing 1 according to the invention. Naturally, the transmission housing 1 can alternatively be used to drive the rear wheels of the vehicle 21 in the same way.

The transmission housing 1 is in this case made of a synthetic material, and is preferably injection molded. This transmission housing 1 has a body 2 formed by two shells 2A and 2B joined by a parting line indicated by reference sign P in the figures. Typically, these shells 2A, 2B are held together at least by bonding using a glue bead applied to the parting line. In the assembled state, these shells 2A, 2B delimit an enclosure 3 that can be at least partially filled with a lubricant such as grease or oil.

This transmission housing 1 comprises, seated at least partially inside the housing 1, at least one rotary input shaft 4 with a longitudinal axis and an output shaft 5 to which the rotational movement of the input shaft 4 can be transmitted. The input shaft 4 is in this case made of metal. This input shaft 4 comprises a drive end 6, accessible from outside the housing 1 to enable said input shaft 4 to be driven in rotation, and an opposite end seated inside the housing in a bearing of the housing at the bottom of the housing 1.

The drive end 6 is designed to be coupled to a drive member 22 to rotate the input shaft 4. This rotary drive member 22 can be an electric motor, a motorized endless transmission belt as in the example shown, or the like.

The input shaft 4 further comprises a threaded portion 7 arranged inside the transmission housing 1 to form a worm screw. This threaded portion 7 of the input shaft 4 meshes with a gear wheel 20 seated in the housing and mounted on the output shaft 5. This gear wheel 20 may be integral with or constrained to rotate with the output shaft 5.

The output shaft 5 forms the rotational drive shaft for the wheels of the vehicle 21. The rotational movement of the drive member 22 of the input shaft 4 is transmitted to the input shaft 4, which in turn transmits the rotational movement to the gear wheel 20 via the threaded portion thereof. When constrained to rotate with the output shaft 5, said gear wheel transmits rotational movement to the output shaft 5 to drive the wheels of the vehicle in rotation.

It should be noted that the gear wheel 20 may be permanently constrained to rotate with the output shaft 5 or may be constrained to rotate with the output shaft 5, for example by axial displacement of the housing 1.

In the examples shown, the output shaft 5 is arranged orthogonally to the input shaft 4. The parting line P of the shells 2A, 2B passes through the longitudinal axis of the input shaft 4 and extends perpendicular to the output shaft 5.

The input shaft 4 is also fitted with a bearing 8. This bearing 8 can be mounted on the input shaft 4 by means of a tubular body interposed between the bearing 8 and the input shaft 4 as described in patent FR 3072432, the tubular body being constrained to rotate with the input shaft 4 by the bearing 8. This bearing 8 comprises an inner ring 9 surrounding said input shaft 4 and, in the example shown, for example in FIG. 4, the tubular body to form a constricting ring force-fitted onto the tubular body, constraining this tubular body to rotate with the input shaft 4. Naturally, any other means for constraining the inner ring 9 of the bearing 8 and the input shaft 4 to rotate together can be used without thereby moving outside the scope of the invention.

The bearing 8 further comprises an outer ring 10 coaxial with the inner ring 9 and bearing members 11, such as balls or needles or the like, arranged between said inner ring 9 and said outer ring 10. The outer ring 10 of the bearing 8 is held in a seat of the housing formed by the shells in the assembled state. The bearing 8 is thus arranged on the input shaft 4 between the threaded portion 7 and the drive end 6 of said input shaft 4.

The transmission housing 1 therefore forms, inside the housing 1, a space 12 to receive this bearing 8 and a space 13 to receive the threaded portion 7. To prevent lubricant from coming to rest on the bearing members of the bearing 8 and passing through the bearing towards the outside of the transmission housing 1, the transmission housing 1 comprises a barrier 14 arranged between the aforementioned spaces 12 and 13. This barrier 14 therefore extends at least partially above the threaded portion 7 of the input shaft 4 when the input shaft 4 is positioned vertically with the bearing 8 arranged above the threaded portion 7 of the input shaft 4. This barrier 14 can have a variety of shapes.

Regardless of the shape thereof, this barrier 14 extends, continuously or discontinuously, about said input shaft 4, providing an access passage 15 for the input shaft 4 from one space to the other space.

This barrier 14 is therefore a barrier surrounding the input shaft 4, delimiting a continuous surface about said input shaft 4, as shown in FIG. 11, or a discontinuous surface, as shown in FIG. 5. This barrier 14 provides an access passage 15, i.e. the passage through which the input shaft 4 passes from one space to the other space. This passage 15 is therefore traversed by the input shaft 4, which thus extends on both sides of the barrier 14.

This barrier 14 comprises at least two parts, indicated by reference signs 16 and 17 in the figures. One of these two parts, indicated by reference sign 16, is carried by the shell 2A, and the other of these two parts, indicated by reference sign 17, is carried by the other shell 2B. Each barrier part 16 or 17 is integral with the related shell 2A or 2B. Thus, the barrier part 16 is integral with the shell 2A, while the barrier part 17 is integral with the shell 2B. At least one of the barrier parts 16 or 17 is shaped to form one or more deflectors.

In the examples shown, the barrier part 16 carried by the shell 2A is shaped to form two deflectors, indicated by reference signs 161 and 162 in the figures, while the barrier part 17 carried by the shell 2B is shaped to form two deflectors, indicated by reference signs 171 and 172 in the figures. These deflectors can have a variety of shapes. Thus, one of the deflectors of at least one barrier part, and preferably both barrier parts 16 and 17, is formed at least partially by a surface sloping downwards from the body 2 of the housing 1 towards the input shaft 4 when the input shaft 4 is in the vertical positioned with the bearing 8 arranged above the threaded portion 7 of the input shaft 4. This arrangement guides a flow of lubricant by gravity.

In the examples shown, at least one, and in this case both, of the barrier parts have two deflectors per barrier part.

In the example shown in FIGS. 9 to 11, each of the deflectors 161 and 162 of the barrier part 16 is formed at least partially by a surface sloping downwards from the body 2 of the housing 1 towards the input shaft 4 when the input shaft 4 is in the vertical positioned with the bearing 8 arranged above the threaded portion 7 of the input shaft. The same applies to the deflectors 171 and 172 of the barrier part 17.

These deflectors 161 and 162 or 171 and 172 of the same barrier part have a joining zone with a V-shaped profile. Thus, the joining zone of the deflectors 161 and 162 of the barrier part 16 is indicated with reference sign 163 in the figures, while the joining zone of the deflectors 171 and 172 of the barrier part 17 is indicated with reference sign 173 in the figures. The deflectors 161 and 162 of the barrier part 16 are respectively joined to the deflectors 171 and 172 of the barrier part 17 when the shells are assembled at the parting line. This parting line of the deflectors between two barrier parts is indicated with reference sign P1 in the figures.

It should be noted that, in the examples shown, the barrier 14 has a plane of symmetry P1 that coincides with the parting line P of the shells 2A and 2B, regardless of the embodiment of the deflectors.

In the example shown in FIGS. 2 to 8, each barrier part 16 or 17 again has two deflectors. Each of the deflectors 161 and 162 of the barrier part 16 is formed at least partially by a surface sloping downwards from the body 2 of the housing 1 towards the input shaft 4 when the input shaft 4 is in the vertical positioned with the bearing 8 arranged above the threaded portion 7 of the input shaft 4. The inclined surfaces converge towards one another. These deflectors 161 and 162 are not joined and one of the deflectors extends at least partially above the other deflector. The same applies to the deflectors 162 and 172 of the barrier part 17. Thus, when the shells 2A and 2B are assembled at the parting line, the deflectors 161 and 171 are joined and form an inclined plane. The same applies to the deflectors 161 and 172. The two inclined planes face each other and can have different or identical slopes. Viewed in cross section, the two inclined planes form the non-joining branches of a V, with one branch extending beyond the other at the point of the V.

Finally, the example in FIGS. 12 to 14 shows each barrier part 16 or 17 again having two deflectors. In this embodiment, the deflector 161 of the barrier part 16 is formed at least partially by a surface sloping downwards from the body 2 of the housing 1 towards the input shaft 4 when the input shaft 4 is in the vertical positioned with the bearing 8 extending above the threaded portion 7 of the input shaft 4, and the deflector 162 is formed by a surface extending orthogonally to the longitudinal axis of the input shaft 4. The same applies respectively to the deflectors 171 and 172.

Regardless of the embodiment, at least a portion of the surface sloping downwards from the body of the housing towards the input shaft of at least one of the deflectors when the input shaft 4 is in the vertical positioned with the bearing 8 arranged above the threaded portion 7 of the input shaft 4 forms a splash guard arranged between the gear wheel 20 and the bearing 8. This splash guard extends in a plane parallel to a plane tangential to said gear wheel 20.

Thus, in the examples shown, at least a portion of the inclined surface of the deflector 171 of the barrier part 17 and at least a portion of the inclined surface of the deflector 161 of the barrier part 16 form a splash guard interposed between the gear wheel 20 and the bearing 8. These two splash guards are coplanar when said shells are assembled.

To obtain a generally circular passage 15, each deflector has a circular arc portion 18 centered on the longitudinal axis of the input shaft 4 to delimit the passage 15 through the barrier 14. Each deflector has an overall annular sector shape. This annular sector, which forms a disk portion, is delimited by two concentric circular arcs. One of the circular arcs forms the circular portion 18 of the deflector used to delimit the passage 15 through the barrier 14, the other circular arc, which may have an imperfect shape to match the shape of the housing body, forms a zone 19 connecting the deflector to the body 2 of the housing 1. This other circular arc can be more or less round, depending on the shape of the housing.

When the shells 2A and 2B of the housing 1 are assembled, the passage 15 through the barrier 14 has a circular or ovoid shape when viewed from the outside of the housing and, in an orthogonal projection in a plane perpendicular to the longitudinal axis of the input shaft 4, has a circumference larger than the circumference of the input shaft 4. This arrangement prevents any contact between the threaded portion 7 of the input shaft 4 and, more generally, between the input shaft 4 and the barrier 14 during rotation of the input shaft 4.

The operation of such a transmission housing is similar to that of transmission housings in the prior art, but the presence of the barrier 14 limits lubricant leakage to the outside of the housing.

The invention claimed is:

1. A transmission housing comprising:
   a body formed by at least two shells that when assembled about a parting line form an enclosure that can be at least partially filled with lubricant,
   this housing comprising, seated at least partially inside the housing, at least one rotary input shaft with a longitudinal axis and an output shaft to which the rotational movement of the or of the at least one of the input shafts can be transmitted,
   this rotary input shaft comprising a drive end that is accessible from outside the housing to enable said input shaft to be driven in rotation and a threaded portion to form a worm screw,
   said input shaft having a bearing comprising a coaxial inner ring surrounding said input shaft and a coaxial outer ring, and bearing members arranged between said rings,
   said bearing being arranged on the input shaft between the threaded portion and the drive end of said input shaft, said housing including a space for receiving this bearing and a space for receiving the threaded portion inside the enclosure,
   wherein the housing comprises a barrier arranged between said spaces, this barrier extending continuously or discontinuously about said input shaft forming an access passage for the input shaft from one space to the other space, this barrier comprising at least two parts, one of said parts being carried by one of the shells and the other of said parts being carried by the other of the shells, each barrier part being integral with the related shell, at least one of the barrier parts being shaped to form one or more deflectors, the or at least one of the deflectors being at least partially formed by a surface sloping downwards from the body of the housing towards the input shaft, when the input shaft is positioned vertically and the bearing is arranged above the threaded portion of the input shaft.

2. The transmission housing as claimed in claim 1, wherein there are two such deflectors of at least one of the barrier parts, each of said deflectors is formed at least partially by a surface sloping downwards from the body of the housing towards the input shaft, when the input shaft is positioned vertically and the bearing is arranged above the threaded portion of the input shaft, and these deflectors have a joining zone with a V-shaped profile.

3. The transmission housing as claimed in claim 1, wherein there are two such deflectors of at least one of the barrier parts, each of said deflectors is formed at least partially by a surface sloping downwards from the body of the housing towards the input shaft, when the input shaft is positioned vertically and the bearing is arranged above the threaded portion of the input shaft, these deflectors are not joined, and one of the deflectors is arranged at least partially above the other deflector.

4. The transmission housing as claimed in claim 1, wherein there are two such deflectors of at least one of the barrier parts, one of the deflectors is formed at least partially by a surface sloping downwards from the body of the housing towards the input shaft, when the input shaft is positioned vertically and the bearing is arranged above the threaded portion of the input shaft, and the other deflector is formed at least partially by a surface extending orthogonally to the longitudinal axis of the input shaft.

5. The transmission housing as claimed in claim 1, wherein at least one of the deflectors has a circular arc portion centered on the longitudinal axis of the input shaft to delimit the passage through the barrier.

6. The transmission housing as claimed in claim 1, wherein at least one of the deflectors forms an annular sector, this annular sector, which forms a disk portion, being delimited by two concentric circular arcs and two radiuses, one of the circular arcs forming the circular arc portion of the deflector used to delimit the passage through the barrier, and the other circular arc forming a zone for connecting the deflector to the body of the housing.

7. The transmission housing as claimed in claim 1, wherein, when the shells of the housing are assembled, the passage through the barrier has a circular or ovoid shape when viewed from the outside of the housing and, in an orthogonal projection in a plane perpendicular to the longitudinal axis of the input shaft, has a circumference larger than the circumference of the input shaft.

8. The transmission housing as claimed in claim 1, wherein the parting line of the shells passes through the longitudinal axis of the input shaft and extends perpendicular to the output shaft.

9. The transmission housing as claimed in claim 8, wherein the barrier has a plane of symmetry that coincides with the parting line of the shells.

10. The transmission housing as claimed in claim 1, the housing includes a gear wheel mounted on the output shaft and meshed with the threaded portion of the input shaft, and in that at least a portion of the surface sloping downwards from the body of the housing towards the input shaft of at least one of the deflectors, when the input shaft is positioned vertically and the bearing is arranged above the threaded portion of the input shaft forms a splash guard between the gear wheel and the bearing and extends in a plane parallel to a plane tangential to said gear wheel.

11. A wheeled vehicle, wherein said wheeled vehicle is provided with a transmission housing as claimed in claim 1.

12. The wheeled vehicle as claimed in claim 11, wherein said wheeled vehicle is a lawnmower.

\* \* \* \* \*